United States Patent [19]

Geus

[11] 3,925,481

[45] Dec. 9, 1975

[54] PROCESS AND CATALYST FOR THE PREPARATION OF KETONES AND/OR ALDEHYDES FROM OLEFINES

[75] Inventor: John W. Geus, Geleen, Netherlands

[73] Assignee: Stamicarbon, B.V., Geleen, Netherlands

[22] Filed: July 20, 1972

[21] Appl. No.: 273,428

Related U.S. Application Data

[63] Continuation-in-part of Ser. Nos. 765,651, Nov. 7, 1968, abandoned, and Ser. No. 108,081, Jan. 20, 1971, abandoned.

[30] Foreign Application Priority Data

Apr. 18, 1970 Netherlands ..................... 7005647

[52] U.S. Cl. ...................... 260/597 R; 260/604 R
[51] Int. Cl.² .......................................... C07C 45/02
[58] Field of Search ............................. 260/597 R

[56] References Cited
UNITED STATES PATENTS 2,260,409   10/1941   Slotterbeck et al. ............ 260/597 R
3,255,238   6/1966   Roelen et al. .................... 260/597 R

FOREIGN PATENTS OR APPLICATIONS 665,214   1/1952   United Kingdom ............ 260/641 R
710,006   6/1954   United Kingdom ............ 260/641 R
767,409   2/1957   United Kingdom ............ 260/597 R

*Primary Examiner*—Raymond V. Rush
*Assistant Examiner*—D. B. Springer
*Attorney, Agent, or Firm*—Cushman, Darby & Cushman

[57] ABSTRACT

There is provided a process for the production of ketones and a catalyst for increasing the proportion of ketone produced by the process, wherein an olefine, molecular oxygen and steam are passed over a catalyst containing discrete particles of tin oxide, a majority of such particles being of a size of at most 50 A, homogeneously distributed over a particulate supporting material, the tin oxide particles being covered by a substantially monomolecular layer of molybdenum oxide.

8 Claims, No Drawings

PROCESS AND CATALYST FOR THE PREPARATION OF KETONES AND/OR ALDEHYDES FROM OLEFINES

DETAILED DESCRIPTION OF THE INVENTION

This is a continuation-in-part of application Ser. No. 765,651, filed Oct. 7, 1968, now abandoned, and is directed toward the subject matter elected for prosecution therein, and of application Ser. No. 108,081, filed Jan. 20, 1971 also now abandoned.

This invention relates to a process for preparing ketones and/or aldehydes by passing olefines, together with molecular oxygen and steam, at elevated temperature over a catalyst consisting of a particulate, thermally stable supporting material to which an oxide of molybdenum and also an oxide of tin has been applied. The invention also relates to the preparation of a catalyst to be used in such a process. It relates in particular to the preparation of acetone (propanone) from propene and of methyl ethyl ketone (butanone) from butene.

It is known that olefines can be converted into ketones, aldehydes and acids by oxidation with the aid of a catalyst containing, for example, heavy metal oxides or metals selected from Group VIII or IB of the Period Table, as the catalytically active component. Due to equilibrium considerations, the selectivity of the process will shift toward the side favoring the formation of ketones only if the catalyst is still sufficiently active at low temperatures. However, thus far one has not succeeded in attaining a satisfactory yield of ketone on an industrial scale, in converting an olefine into the corresponding ketone with the aid of such presently known catalysts.

It is also known that the activity of the known catalysts is not determined exclusively by the gross chemical composition of the catalyst system, but also by the nature of the catalyst surface. The present invention is based on the use of catalysts with a catalytic surface of a special nature.

It is therefore an object of the invention to provide a process and catalyst system which is very selective and from which the proportion of ketones, as opposed to other products, is high. It is a further object to provide a process for preparing such a catalyst system. Other objects will be apparent from the following disclosure and claims.

It has now been found that in the preparation of ketones by the oxidation of olefines at an elevated temperature in the presence of a catalyst, a strong shift of the reactivity and the selectivity in favor of the formation of ketones as opposed to other reaction by-products can be obtained by (1) passing the olefine, along with air and steam each in an amount preferably close to or in excess of the amount of olefine, (2) over a catalyst system containing discrete tin oxide particles, a majority of which are of a size of at most 50 A units, homogeneously distributed over a particulate supporting material, such tin oxide particles being substantially covered by a layer of a molybdenum oxide. The invention has been found to be most specifically applicable to the oxidation of aliphatic mono-olefins, containing up to 4 carbon atoms, to the corresponding ketone.

The improved catalyst used for carrying out the process of the invention is prepared by first applying finely divided, discrete, catalytically active particles of tin oxide homogeneously over the surface of a solid particulate, thermally stable supporting material, over which a very thin, preferably substantially monomolecular, layer of molybdenum oxide is subsequently applied.

At least a majority, but preferably all, of the tin oxide particles should be of a size of at most 50 A units. Such finely divided particles of tin oxide are homogeneously applied to the supporting or carrier material, according to one feature of the invention, by forming an agitated suspension of the particulate supporting material in a dilute aqueous solution, e.g., 0.5 molar to 0.01 molar concentration of tin ions. Precipitation nuclei of hydrated tin oxide are then caused to form substantially exclusively on the surface of the suspended, finely divided supporting material by the gradual and homogeneous in situ generation or formation of hydroxyl ions within the solution under the closely controlled conditions of the invention.

The condition for precipitation exclusively onto the carrier is to generate hydroxyl ions homogeneously in the solution at a rate that prevents exceeding of the solubility product above which nucleation of a pure precipitate within the aqueous solution per se is liable to occur. This also means that the migration of the still soluble precipitate, through the solution to the carrier surface has to be faster than or at least as fast as the generation of hydroxyl ions. The free energy and, hence, the solubility product of nuclei of a precipitating material are appreciably higher than the corresponding values for large precipitate particles, owing to the minute dimensions of the nuclei.

The rate at which the material to be precipitated is transported through the solution depends partly on the intensity with which the solution is agitated, and on the degree to which the solid carrier material is distributed through the suspension. Under these conditions mentioned above, the precipitate will form homogeneously over the entire surface of the carrier material. As the carrier materials used in practice have very large specific surface areas, the precipitate will be distributed homogeneously over a very large surface area. Since the above-mentioned nuclei are formed exclusively on the surface of the carrier material, and not elsewhere in the solution, undesirable development of nuclei into a coarse precipitate will not take place in the solution.

Since the rate at which the material to be precipitated migrates through the liquid depends inter alia on the intensity with which the solution is agitated, and on the degree of distribution of the solid carrier material in the suspension, these two variables can be controlled within very wide limits. The desired result can further be chosen by controlling the above-mentioned variables. To ensure homogeneous and gradual formation of hydroxyl ions in the solution, the process according to the invention makes use of chemical reactions known in the art, e.g., homogeneous and gradual formation of hydroxyl ions by hydrolysis of urea present in the solution to ammonium carbamate, or ammonium carbonate. The hydrolysis of urea which is dissolved in the suspension ensures a homogeneous increase in the hydroxyl concentration; the rate at which the hydrolysis proceeds can easily be controlled by the temperature to which the suspension is heated, e.g., at a temperature of from about 70°C to 100°C. Instead of urea, derivatives of urea may be used, if so desired, or any other of the known reactants which will produce a gradual formation of hydroxyl ions, as e.g., formamide, acetamide, hexamethylene diamine or sodium nitrate. The concentration of urea or the equivalents as noted above is not critical, but is conveniently between about 1:1 to 10:1 relative to the hydroxides or oxides to be precipitated.

The molybdenum layer will preferably be substantially monomolecular and may be deposited onto the tin oxide loaded supporting material by adding molybdenum to the suspension of the tin oxide loaded supporting material as a salt or oxide of molybdenum, e.g., as ammonium molybdate or $MoO_3$. The loaded supporting material is then separated from the molybdenum compound containing solution, dried, e.g., at about 100°C to 150°C for about 8 hours to 24 hours, pelletized if desired, and calcined, e.g., at about 300°C to 700°C for about 3 to 24 hours. Alternatively, the loaded supporting material as above, after separation from the molybdenum compound containing solution, can be heated in a stream of steam at a temperature of about 300°C to 700°C for a period of from about 8 to 24 hours.

The molybdenum layer may also be deposited as $MoO_2(OH)_2$ over the tin oxide loaded supporting material after it has been separated from the aqueous medium rather than first adding the molybdenum compound to the aqueous medium. Preferably this steam treatment is carried out for about 8 to 72 hours, using $MoO_2(OH)_2$ saturated steam at a temperature of about 300°C to 700°C.

Under these circumstances, the molybdenum oxide volatizes and deposits on the tin oxide. In addition, a combination of the above techniques may be employed.

The supporting or carrier materials used in this invention are illustrated by such thermally stable inorganic compositions such as silica, alumina, titanium dioxide, kaolinite, aluminosilicates, carbon and the like, but the particular supporting material employed is not critical to the invention and any thermally stable, inorganic, particulate, water-suspendable composition providing a nucleation surface may be used. However, silica is preferred if the catalyst is employed in a fluidized bed.

The tin and molybdenum oxides may be any of the oxides known in the art, and may be precipitated onto the supporting material from a solution of the common salts such as nitrates, chlorides, sulphates and the like.

The above described catalyst system has been found to be particularly applicable to the oxidation of aliphatic mono-olefines containing up to 4 carbon atoms to the corresponding ketone, and this invention is therefore also directed toward an improved process for the oxidation of such olefines utilizing this catalyst whereby the selectivity in favor of the formation of ketones, as opposed to other reaction by-products, is greatly increased as compared to presently known processes.

The improved process of this invention consists essentially in passing the olefine, air and steam over the above-described catalyst system, wherein the air and steam are present in significant amounts, and generally in dominant amount with respect to the olefine. Preferably, the ratio of steam to air should be within the range of about 1:1.5 to 1.5:1. Although the use of air is preferred as the most readily accessible source of molecular oxygen, other sources of molecular oxygen may be employed, in which case the ratio of steam to molecular oxygen is preferably within the range of from about 1:0.3 to 1:0.3. The ratio of steam to olefine should be in excess of about 2:1 to 25:1.

In carrying out the conversion of olefine to ketone, the reaction temperature or the temperature at the surface of the catalyst should generally be maintained within the range of from about 100°C to about 500°C, preferably between about 125°C and 300°C. If selectivity toward the preparation of ketone is desired, this temperature is preferably maintained at between about 125° to 200°C for butanone, and between about 250° to 350°C for acetone. On the other hand, if selectivity toward the aldehyde is desired, a higher temperature is preferred.

The pressure at which the conversion is carried out is not critical and may be maintained at atmospheric or superatmospheric pressure, e.g., to about 10 atmospheres. The conversion is preferably carried out at a space velocity of about 100 up to about 15,000 hr$^{-1}$.

The process and catalyst according to the invention will be illustrated in the following comparative examples for the preparation of:

I. acetone (propanone) from propene by means of comparative examples which show the selectivity of five differently prepared catalysts, including one made according to the present invention. The examples demonstrate the importance and influence of the present catalyst surface.

II. methyl ethyl ketone (butanone) from butene by means of comparative examples.

I. ACETONE FROM PROPENE

For this comparison propylene, in combination with air and steam, and in respective vol. ratios of 1:13 : 2:9 were passed over the following five catalysts, i.e., A through E, at temperatures noted hereinafter. The reaction products thus obtained were analyzed. The yield of acetone is, of course, of particular importance in this connection.

The catalysts A to E were prepared in the manner set forth below. In the catalysts A to C large tin dioxide particles were used. An inert supporting material to arrive at and to stabilize small tin dioxide particles is not necessary here. To avoid dilution of the catalyst with inactive support, the carrier was omitted in these catalysts. In catalysts D and E small tin dioxide particles were applied; hence a support with a high surface area has to be used according to the invention.

A. 5 g of tin dioxide having a specific surface area of 3 sq. m per gram was suspended at 20°C, together with 2.5 g of $MoO_3$, in 100 ml of water. The suspension was filtered, washed with water, and dried at 450°C for 16 hours. Thereafter the catalyst mass was first treated with steam in the reactor at 475°C for 16 hours. The tin dioxide particles had a mean diameter of about $2 \times 10^5$ A units.

B. 5 g of tin dioxide having a specific surface area of 3 sq. m per gram was loaded with $MoO_2(OH)_2$ in a reactor by passing over it steam saturated with $MoO_2(OH)_2$ at 450°C for 45 hours. The tin dioxide particles had a mean diameter of about $2 \times 10^5$ A units.

C. Tin dioxide with a specific surface area of 25 sq. m per gram was obtained by treating granulated tin with nitric acid at 20°C, drying at 120°C, and finally heating at 500°C for 16 hours. Electron microscopy showed the tin dioxide particles to have a mean diameter of 250 A units. Subsequently, the tin dioxide was loaded with $MoO_2(OH)_2$ in the reactor, by passing over it steam saturated with $MoO_2(OH)_2$ at 450°C for 40 hours.

D. 75 g of "Aerosil", which is silica (prepared by flame hydrolysis of $SiCl_4$, traded by Degussa, Hanau, Germany as "Aerosil", specific surface area 175 m²g⁻¹), was impregnated in a solution with 11.4 g of SnCl₄. 5 H₂O in 1 liter of water. After the pH had been brought to 7 by means of ammonia, 20 g of MoO₃ was added. The suspension was then filtered, dried at 120°C, and calcined at 450°C for 16 hours. The result of the analysis was: SnO₂:4.2%; MoO₃:20.4%; SiO₂:75.4%. The tin oxide particles were heavily conglomerated. The size of the conglomerates was greater than 100 A units. The conglomerates were covered by a monomolecular layer of a molybdenum compound by heating in a stream of steam for 16 hrs at 450°C.

E. The catalyst was prepared according to the present invention. To this end, 75 g of "Aerosil" (see above under "D") was suspended in a solution of 11.4 g of SnCl₄.5 H₂O in 1 liter of water at 20°C. Then 19.4 g of urea was added, after which the suspension was boiled, with intensive stirring, until a pH value of 7 had been reached. After the suspension had cooled down, to approximately 40°C 20 g of MoO₃ was added, with stirring. The suspension was then filtered and washed with 500 ml of water. Finally, the material was calcined at 550°C for 16 hours. Electron microscopic examination revealed the tin oxide to have been homogeneously applied to the "aerosil" as particles having a mean size of 10 A units. These particles were covered by a monomolecular layer of a molybdenum compound by heating in a stream of steam for 16 hrs at 450°C. The analysis gave the following result: SnO₂:4%; MoO₃:20%; SiO₂:75%.

The results of a first series of experiments, with a low degree of conversion of propylene and a high catalyst temperature, were:

Series I

| Catalyst | A | B | E |
|---|---|---|---|
| Mean temperature of catalyst, surface,°C | 348 | 342 | 350 |
| Conversion of propylene, % | 5.2 | 4.5 | 1.1 |
| Selectivity, % | | | |
| decomposition to CO and CO₂ | 7 | 10 | — |
| acetone | /43/ | /30/ | /65/ |
| acetic acid | 37 | 49 | 9.7 |
| acrolein | 6 | 2.5 | 14 |
| acrylic acid | 1 | 1.5 | — |
| maleic acid | 2 | 4 | — |
| acetaldehyde | 4 | 3 | 11 |

In view of the high activity of catalyst E, it was necessary in this experiment — in order to obtain a comparable low conversion — to keep the contact time very short. The contact time was smaller by a factor of about 10 than the contact time used with catalysts A and B; with this short contact time the conversion proved to be 4–5 times lower.

The results of a second series of experiments, with a low degree of propylene conversion and a lower catalyst temperature, were:

Series II

| Catalyst | C | E |
|---|---|---|
| Mean temperature of catalyst surface °C | 272 | 275 |
| Conversion of propylene, % | 5.0 | 4.8 |
| Selectivity, % | | |
| decomposition to CO and CO₂ | 19 | 9.1 |
| acetone | /47/ | /81/ |
| acetic acid | 24 | 4.6 |
| acrolein | 0.2 | — |
| acrylic acid | 0.6 | 0.5 |
| maleic acid | 4 | — |
| acetaldehyde | 5 | 5 |

A third series of experiments were made with a high degree of propylene conversion and a high catalyst temperature. In this series the gross chemical composition of the catalysts, D and E, was approximately the same.

Series III

| Catalyst | D | E |
|---|---|---|
| Mean temperature of catalyst surface, °C | 340 | 340 |
| Conversion of propylene, % | 85 | 97 |
| Selectivity, % | | |
| decomposition to CO and CO₂ | 29.5 | 21.8 |
| acetone | 4.7 | 21.4 |
| acetic acid | 49.5 | 42.5 |
| acrolein | 2.4 | 3.7 |
| acrylic acid | 1.2 | 0.2 |
| maleic acid | 9.4 | 6.1 |
| acetaldehyde | 3.5 | 4.6 |

It is to be noted that because of the exothermic reaction the catalyst temperatures stated are higher than the temperatures of the heating agents used for keeping the reactor at the desired temperature.

From the above comparative examples with the five catalysts in the three series of experiments the following can be seen:

1. The way in which SnO₂ is loaded with molybdenum oxide does not influence the results; compare catalyst A with catalyst B in the first series.

2. Catalysts of equal gross chemical composition do not produce equal results; compare, in the third series, catalyst D, which has been impregnated with "aerosil", with catalyst E, in which SnO₂ has been applied, as particles with a mean diameter of 10 A units, to "aerosil".

3. Whereas, in the third series, the degree of conversion is considerably higher with catalyst E (97%) than with catalyst D (85%), the acetone production is up by a factor 4.

4. If propylene is used, the decomposition to CO and CO₂ and the formation of acetic acid are materially lower with catalyst E than with any other catalyst, particularly at low degrees of conversion.

5. If propylene is used, the selectivity for the formation of acetone is materially different — and more favorable — with catalyst E than with any other catalyst, both at a low and at a high degree of conversion; compare the first and second series with the third.

6. Particularly at low temperatures, the selectivity of catalyst E is especially favorable; see the second series.

II. METHYL ETHYL KETONE (BUTANONE) FROM BUTENE

In these experiments, butene was, together with air and steam, passed over the catalyst mass present in a reactor, under reaction conditions which varied from experiment to experiment and will be specified later on. The reaction product obtained was analyzed, special attention being paid to the determination of the yields of butanone, acetaldehyde, and acids and of the combustion products CO and CO₂.

The catalyst masses were composed according to the specifications of the present invention. One of the catalysts employed was prepared as follows: 74 g of "aerosil" were suspended in a solution of 15.0 g of SnCl₄ 5 aq. in 1 liter of water at 20°C. Subsequently, 25 g of urea were added, after which the suspension was boiled, with vigorous stirring, until a pH value of 7 had been reached. After the suspension had been cooled, to approximately 40°C, 20 g of MoO₃ were added with simultaneous stirring. The suspension was then passed through a filter and washed with 500 ml of water. Finally, the material was calcined at 450°C for 16 hrs. Electron-microscopic examination showed that the tin oxide was homogeneously distributed over the "aerosil" in the form of particles having an average diameter of 10 A units. Said particles were covered with a monomolecular layer of a molybdenum compound by passing steam over the mass at 450°C for 16 hours. Under these circumstances, the molybdenum oxide volatilizes and deposits on the tin oxide. The results of the analysis were as follows: 7.4%: $SnO_2$, 15.3%: $MoO_3$, 77.3%: $SiO_2$.

The other catalysts used in the experiments were prepared by similar methods.

The results of the experiments are shown in the tables A–E, which will be discussed successively.

Table A

| Experiment no. | 52 | 80 |
| --- | --- | --- |
| Butene | butene-1 | butene-2 |
| Butene:air:steam | 1:14:9 | 1:16:11 |
| Temp. catalyst (°C) | 228 | 224 |
| $SnO_2$ on catalyst (%) | 7.4 | 7.4 |
| Space velocity hr$^{-1}$ | 2200 | 2390 |
| Conversion (%) | 4.5 | 7.4 |
| Selectivity (%) | | |

Table A-continued

| Experiment no. | 52 | 80 |
| --- | --- | --- |
| $CO + CO_2$ | 18.7 | 11.8 |
| butanone | 47.0 | 52.8 |
| acetaldehyde | 8.9 | 11.1 |
| acetic acid | 13.0 | 15.1 |
| acetone | 2.8 | 2.2 |
| methacrolein | 1.3 | 0.7 |
| maleic acid | 8.7 | 5.1 |
| formic acid | 0.2 | 1.2 |

Table B

| Experiment no. | 70 | 69 | 68 | 71 | 75 | 74 | 73 | 76 |
| --- | --- | --- | --- | --- | --- | --- | --- | --- |
| Butene | -1 | -1 | -1 | -1 | -2 | -2 | -2 | -2 |
| Butene:air:steam | 1:15:12 | 1:17:13 | 1:15:11½ | 1:15:12 | 1:14½:11 | 1:14½:22 | 1:14½:11 | 1:15½:11½ |
| $SnO_2$ on catalyst (%) | 7.4 | 7.4 | 7.4 | 7.4 | 7.4 | 7.4 | 7.4 | 7.4 |
| Temp. catalyst (°C) | 153 | 154 | 154 | 152 | 154 | 153 | 154 | 153 |
| Space velocity (hr$^{-1}$) | 650 | 1370 | 2560 | 3900 | 650 | 1270 | 2390 | 3810 |
| Conversion (%) | 1.9 | 0.87 | 0.51 | 0.42 | 2.15 | 1.08 | 0.89 | 0.84 |
| Selectivity (%) | | | | | | | | |
| $CO + CO_2$ | 19.0 | — | — | — | 4.95 | 8.2 | 9.1 | 6.2 |
| butanone | 71.5 | 87.5 | 82.5 | 89.0 | 82.4 | 76.3 | 76.6 | 84.0 |
| acetaldehyde | 2.2 | 2.1 | 1.6 | 1.7 | 7.7 | 8.25 | 7.6 | 5.3 |
| acetic acid | 3.9 | 6.1 | 10.2 | 5.5 | 3.0 | 4.9 | 4.4 | 2.6 |
| acetone | — | — | — | — | 0.7 | 0.55 | 0.5 | 0.9 |
| methacrolein | 2.2 | 2.5 | 2.4 | 2.4 | — | — | — | — |
| maleic acid | 1.0 | 1.4 | 2.6 | 1.4 | 1.0 | 1.5 | 1.4 | 0.8 |
| formic acid | 0.2 | 0.3 | 0.7 | 0.3 | 0.3 | 0.4 | 0.4 | 0.2 |

Table C

| Experiment no. | 43 | 45 | 47 | 48 | 49 | 77 | 78 | 79 | 80 | 81 |
| --- | --- | --- | --- | --- | --- | --- | --- | --- | --- | --- |
| Butene | -1 | -1 | -1 | -1 | -1 | -2 | -2 | -2 | -2 | -2 |
| Butene:air:steam | 1:14:6 | 1:14:6 | 1:14:6 | 1:14:6 | 1:14:6 | 1:15:9½ | 1:15:9½ | 1:15:9½ | 1:15:9½ | 1:15:9½ |
| % $SnO_2$ on catalyst (%) | 7.4 | 7.4 | 7.4 | 7.4 | 7.4 | 7.4 | 7.4 | 7.4 | 7.4 | 7.4 |
| Temp. catalyst (°C) | 155 | 208 | 233 | 254 | 268 | 157 | 179 | 197 | 224 | 259 |
| Space velocity (hr$^{-1}$) | 2000 | 2000 | 2000 | 2000 | 2000 | 2390 | 2390 | 2390 | 2520 | 2390 |
| Conversion (%) | 0.48 | 1.42 | 2.75 | 5.6 | 6.4 | 1.6 | 3.5 | 4.1 | 9.6 | 11.4 |
| Selectivity (%) | | | | | | | | | | |
| $CO + CO_2$ | 0.0 | 28.9 | 29.6 | 34.4 | 39.1 | 0.0 | 11.4 | 10.0 | 35.6 | 31.0 |
| butanone | 74.0 | 49.3 | 40.4 | 33.6 | 29.2 | 86.5 | 72.5 | 68.1 | 39.6 | 26.8 |
| acetaldehyde | 2.7 | 6.3 | 9.8 | 13.8 | 14.1 | 8.6 | 8.25 | 9.05 | 8.3 | 10.0 |
| acetic acid | 14.3 | 8.7 | 10.9 | 9.2 | 8.0 | 2.9 | 4.4 | 7.4 | 10.2 | 20.2 |
| acetone | 0.7 | 1.7 | 2.9 | 3.4 | 3.5 | 0.9 | 1.25 | 1.75 | 1.7 | 2.2 |
| methacrolein | 2.0 | 1.8 | 2.0 | 2.0 | 3.0 | 0.1 | 0.5 | 0.5 | 0.5 | 1.4 |
| maleic acid | 5.2 | 2.6 | 3.4 | 2.9 | 2.5 | 0.9 | 1.5 | 2.4 | 3.4 | 6.7 |
| formic acid | 1.3 | 0.6 | 0.8 | 0.7 | 0.6 | 0.2 | 0.4 | 0.6 | 0.8 | 1.7 |

Table D

| Experiment no. | 77 | 128 | 113 |
| --- | --- | --- | --- |
| Butene | -2 | -2 | -2 |
| Butene:air:steam | 1:15:9½ | 1:15:10½ | 1:16:11½ |
| $SnO_2$ on catalyst (%) | 7.4 | 18.0 | 43.8 |
| Temp. catalyst (°C) | 157 | 163 | 158 |
| Space velocity (hr$^{-1}$) | 2390 | 2320 | 2220 |
| Conversion (%) | 1.6 | 4.6 | 3.05 |
| Selectivity (%) | | | |
| $CO + CO_2$ | 0.0 | 9.0 | 13.4 |
| butanone | 86.5 | 69.5 | 76.1 |
| acetaldehyde | 8.6 | 7.1 | 5.6 |
| acetic acid | 2.9 | 9.8 | 2.9 |
| acetone | 0.9 | 0.7 | 0.8 |
| methacrolein | 0.1 | — | — |
| maleic acid | 0.9 | 3.2 | 1.2 |
| formic acid | 0.2 | 0.8 | 0.2 |

Table E

| Experiment no. | 66 | 65 | 64 | 67 | 128 | 133 | 138 |
| --- | --- | --- | --- | --- | --- | --- | --- |
| Butene | -1 | -1 | -1 | -1 | -2 | -2 | -2 |
| Butene:air:steam | 1:30:22 | 1:15½:12 | 1:8.7:7 | 1:3.6:3.3 | 1:14½:10½ | 1:14½:2.4 | 1:14½:0.7 |
| $SnO_2$ on catalyst (%) | 7.4 | 7.4 | 7.4 | 7.4 | 18.0 | 18.0 | 18.0 |
| Temp. catalyst (°C) | 246 | 249 | 252 | 255 | 163 | 163 | 130 |
| Space velocity (hr$^{-1}$) | 1310 | 1320 | 1380 | 1620 | 2320 | 1560 | 1470 |
| Conversion (%) | 16.0 | 10.8 | 7.9 | 3.54 | 4.6 | 6.9 | 1.2 |
| Selectivity (%) | | | | | | | |
| $CO + CO_2$ | 29.4 | 27.2 | 29.6 | 20.9 | 9.0 | 6.5 | 0 |

Table E-continued

| Experiment no. | 66 | 65 | 64 | 67 | 128 | 133 | 138 |
|---|---|---|---|---|---|---|---|
| butanone | 26.1 | 32.6 | 36.2 | 52.3 | 69.5 | 66.0 | 80.5 |
| acetaldehyde | 8.8 | 9.4 | 8.5 | 9.9 | 7.1 | 13.5 | 14.4 |
| acetic acid | 22.9 | 21.9 | 17.6 | 11.4 | 9.8 | 8.6 | 3.2 |
| acetone | 2.2 | 2.0 | 2.0 | 2.4 | 0.7 | 2.1 | 0.6 |
| methacrolein | 1.2 | 1.3 | 1.3 | 2.4 | — | — | — |
| maleic acid | 6.4 | 5.5 | 4.9 | — | 3.2 | 2.7 | 1.0 |
| formic acid | 3.3 | 0.1 | 1.2 | 1.0 | 0.8 | 0.7 | 0.2 |

In the tables A and B the results are compared of experiments started from butene-1 and butene-2. It appears that the reactivity of butene-2 is greater than that of butene-1; the conversion is distinctly higher in the experiments with butene-2, while the two basic materials do not show an appreciable difference as far as the butanone yields are concerned.

The preparation of butanone by the process according to the invention is therefore preferably started from butene-2.

In table B, the influence of the space velocity is shown both for butene-1 and for butene-2. The conversion increases at lower space velocities; in the case of butene-2, the formation of CO and $CO_2$ does not appreciably increase with the conversion, while in the case of butene-1 the said formation shows a distinct increase.

Table C shows the influence of the catalyst temperature in the various experiments. Both with butene-1 and with butene-2, the conversion increases with the temperature; this is attended with a decrease of the butanone yield and an increase of the yields of CO and $CO_2$. At higher temperatures, butene-1 yields more acetaldehyde, whereas in the case of butene-2 the yield of acetic acid increases. According to the invention, the preparation of butanone and/or acetaldehyde from butene is preferably effected at an average temperature of the catalyst surface intervening between 125° and 300°C. If it is desired that butanone is formed as the main product, a temperature ranging from 125° to 200°C is preferably employed; if acetaldehyde is desired as the product — or as one of the products —, a temperature above 200°C is preferably applied.

Table D shows the effect of the tin dioxide content of the catalyst. With the catalysts containing 18.0 and 43.8% of tin dioxide, the conversion is distinctly higher than in the case of the catalyst having a tin dioxide content of 7.4%. The somewhat higher conversion achieved with the catalyst containing 18.0% of tin dioxide is caused by the somewhat higher reaction temperature employed in that case, viz. 163°C against 158°C in the case of the catalyst with a tin dioxide content of 43.8%. As in the other experiments, the butanone yield decreases slightly when the conversion is increased.

Table E shows the influence of the butene/air/steam ratio. In the case of butene-1, the conversion increases with the amount of steam employed, while the yield of acetic acid increases at the cost of that of butanone. The conversion of butene-2 as a function of the amount of steam employed shows a maximum when the latter is comparatively small. It is noteworthy that if, at a low reaction temperature, the amount of steam employed is smaller than the amount of butene supplied, a high selectivity towards the formation of butanone is obtained. Heat losses can thus be restricted, which makes it attractive to recycle the product flow in industrial applications of the process according to the invention.

As will be appreciated by those skilled in the art, many modifications of the invention will be readily apparent to those skilled in the art, and these modifications are intended to be included therein. The invention, accordingly, extends to be spirit and scope of the following claims.

What is claimed is:

1. In a process for preparing ketones wherein an alkene containing up to 4 carbon atoms and an oxidizing agent are passed at an elevated temperature over a supported catalyst, the improvement consisting essentially in reacting said alkene together with both molecular oxygen and steam in a combined amount in excess of the quantity of said alkene in the presence of a catalyst system containing finely divided discrete tin oxide particles, a majority of which are of a size of at most 50 A units, homogeneously distributed over a solid particulate, inorganic, thermally stable supporting material, and having a substantially monomolecular layer of molybdenum oxide deposited over said discrete tin oxide particles, said reaction being carried out at an average catalyst surface temperature within the range of between 100°C to about 350°C.

2. The process of claim 1 wherein said temperature is between about 125°C to about 300°C.

3. The process of claim 1 wherein said alkene is propene and said ketone is acetone.

4. The process of claim 3 wherein said temperature is between about 250°C to about 350°C.

5. The process of claim 1 wherein said alkene is butene and said ketone is methyl ethyl ketone.

6. The process of claim 5 wherein said butene is butene-2.

7. The process of claim 5 wherein said temperature is between about 125°C to 200°C.

8. The process of claim 1 wherein said molecular oxygen is present as a constituent of air.

* * * * *